United States Patent [19]

Valyi

[11] Patent Number: 4,604,258
[45] Date of Patent: Aug. 5, 1986

[54] STACK-MOLD FOR INJECTION BLOW MOLDING

[75] Inventor: Emery I. Valyi, Stamford, Conn.

[73] Assignee: Canada Cup, Inc., Toronto, Canada

[21] Appl. No.: 671,596

[22] Filed: Nov. 15, 1984

[51] Int. Cl.$^4$ .................. B29C 49/06; B29C 49/32
[52] U.S. Cl. .................. 264/537; 425/533; 425/534; 425/537
[58] Field of Search .......... 264/537, 538, 297.2; 425/533, 534, 537

[56] References Cited

U.S. PATENT DOCUMENTS

| | | | |
|---|---|---|---|
| 3,011,216 | 12/1961 | Gussoni | 264/537 |
| 3,441,982 | 5/1969 | Sagara et al. | 425/533 X |
| 4,065,246 | 12/1977 | Marcus | 425/533 X |
| 4,244,909 | 1/1981 | Gellert | 264/297.2 |

FOREIGN PATENT DOCUMENTS 2339018 2/1975 Fed. Rep. of Germany ...... 425/533
1183255 7/1959 France ............................. 425/533

Primary Examiner—Jan Silbaugh
Attorney, Agent, or Firm—Bachman & LaPointe

[57] ABSTRACT

A method and apparatus for injection blow molding hollow plastic articles characterized by increased capacity due to back-to-back operations or stack molding and a rapid and efficient operating cycle. The process and apparatus includes back-to-back injection mold stations, back-to-back blow mold stations located on each side of and adjacent said injection mold stations in side-by-side relationship therewith, back-to-back ejection stations located adjacent each of said blow mold stations in side-by-side relationship, and blow cores cooperating with said injection stations and blow stations, wherein the operation of said cores is facilitated by an overlapping cycle.

6 Claims, 2 Drawing Figures

STACK-MOLD FOR INJECTION BLOW MOLDING

BACKGROUND OF THE INVENTION

Injection blow molding processes and apparatus are widely known and widely used in industry. For example, reference should be had to U.S. Pat. No. 3,183,552 to Farkas, U.S. Pat. No. 3,819,314 to Marcus, U.S. Pat. No. 3,339,231 to Piotrowski and Canadian Pat. No. 995,418 to Cannon et al.

It is and has been a long standing objective of art processes to achieve a high productivity, i.e., to develop a process with a rapid, efficient and economical operating cycle. Art processes known heretofore are subject to one or more significant disadvantages. Frequently, they are cumbersome and expensive to operate, and characterized by a relatively slow operating cycle. A shorter operating cycle is particularly desirable since it is directly translatable into a larger number of end products produced.

Processes are known with overlapping cycles in order to reduce overall cycle time, for example, by providing that while one parison is being molded another is being blown and still another is being removed. However, even with processes using overlapping cycles the output still leaves much to be desired even after improvement in cycle time.

The foregoing difficulties are at times further compounded by lack of reliability of prior art processes necessitating interruptions of the operation that impair operating efficiency.

Stack-molds are frequently used for injection molding of relatively flat articles and also of cup-shaped articles. The principle of such a mold is to use back-to-back injection molds in order to double the output of the unit without substantially increasing its size. Thus, if a stack-mold is used for a two impression mold one would obtain four impressions consisting of a "stack" of two times two impressions, back-to-back.

However, difficulties are encountered in using stack-molds in injection blow molding since doing so affects other components of the mold set besides the injection mold. For example, a preferred operation embodied in copending U.S. patent application Ser. No. 618,956, for INJECTION BLOW MOLDING PROCESS AND APPARATUS, By Tommy Thomas and John W. West, filed June 11, 1984, now U.S. Pat. No. 4,540,543, issued Sept. 10, 1985, assigned to a common assignee and the disclosure of which is incorporated herein by reference, shows, in addition to the injection mold, a blow core, a blow mold, a removal mold and a removal mandrel. When one stacks this injection mold in this type of assembly insufficient space is provided for the removal of finished parts without extraordinary measures and casing interference of the function of one removal mold with that of the other.

Accordingly, it is a principal object of the present invention to provide a process and apparatus for injection blow molding hollow plastic articles using a stack-mold for injection, and to provide a mold assembly characterized by a rapid, efficient and economical operating cycle in which finished parts removal may be effected without interference.

It is a still further object of the present invention to provide a process and apparatus as aforesaid which is convenient and easy to use on a commercial scale and may be reliably used with high productivity.

Further objects and advantages of the present invention will appear from the following specification.

SUMMARY OF THE INVENTION

In accordance with the present invention, it has now been found that the foregoing objects and advantages are obtained. The method and apparatus of the present invention are for injection blow molding hollow plastic articles. The method comprises providing back-to-back first and second injection molds each including a respective first and second mold cavity formed by a respective first and second mold wall and a respective first and second core, back-to-back first and second blow molds each adjacent respective first and second mold cavities in side-by-side relationship therewith, back-to-back first and second ejection stations in side-by-side relationship with said respective first and second blow molds, and first and second objection mandrels adjacent respective first and second cores, injecting molten plastic into said mold cavities to form first and second parisons on said cores, moving said parisons on said cores into said blow molds, expanding said parisons on said cores in said blow molds to form hollow articles, transferring said hollow articles to said ejection stations and removing said hollow articles from said ejection stations, wherein said first and second cores and said first and second mandrels operate in overlapping cycles whereby said first core and first mandrel are located at said first injection mold and first blow mold, respectively while said second core and second mandrel are located at a position spaced from said second injection mold and second blow mold, respectively and preferably at said second blow mold and second ejection station. In accordance with the preferred embodiment first and second ejection mandrels are provided engageable with said first and second ejection stations, respectively, and including the steps of transferring the hollow articles from said blow molds to said ejection stations on said ejection mandrels. Said cores, blow molds and ejection stations comprise a first set and second set, respectively; and a corresponding third and fourth set of cores, mandrels, blow molds and ejection stations are provided adjacent and in line with the first and second set, respectively, with the blow molds and ejection stations in back-to-back relationship with each other and on opposite sides of said first and second injection molds. In the preferred operation one locates said first core and first ejection mandrel at said first injection mold and first blow mold, respectively, while said second core and second ejection mandrel are at the same time located at said second blow mold and second ejection station, respectively. Similarly, the third and fourth sets are simultaneously in corresponding positions with injection taking place simultaneously in two opposed injection molds. It is particularly advantageous to provide a common platen for the first and third cores and a common platen for the second and fourth cores with balanced motive means for both platens in order to use less force to move the platens.

The apparatus of the present invention comprises back-to-back first and second injection molds each including a mold wall, opposing first and second cores each engageable with a respective injection mold to form a mold cavity with its respective mold wall, means to inject molten plastic into said mold cavities to form parisons therein, back-to-back first and second blow molds adjacent respective injection mold cavities in side-by-side relationship therewith, back-to-back first and second ejection stations adjacent respective blow molds in side-by-side relationship therewith, means to move said parisons from said first and second injection molds to said first and second blow molds and means to expand said parisons in said blow molds to form hollow articles therein, means to move said hollow articles from said blow molds to said ejection stations for removal therefrom, and means to locate said first and second cores in overlapping cycles wherein said first core is located at said first injection mold while said second core is located at a position spaced from said second injection mold and preferably at said second blow mold.

In accordance with a preferred embodiment first and second ejection mandrels are provided adjacent and in side-by-side relationship to said first and second cores, respectively, engageable with the first and second ejection stations, respectively, operative to transfer the hollow articles from said blow molds to said ejection stations. The cores, mandrels, blow molds and ejection stations comprise a first and second set, respectively. Preferably, a corresponding third and fourth set of cores, mandrels, blow molds and ejection stations are provided adjacent and in line with the first and second set, respectively, in back-to-back relationship with each other and on opposite sides of said first and second injection molds, wherein the first and second set are operative to operate in overlapping cycles with eacy other and at the same time the third and fourth sets are operative to operate in overlapping cycles with each other.

Thus, it can be readily seen that in accordance with the process and apparatus of the present invention stack-molds are provided for injections conveniently and expeditiously enabling one to produce simultaneously twice as many parts in the same interval, thereby doubling the output. The overlapping cycle operation is especially expeditious and enables the process and apparatus to operate smoothly and efficiently. Moreover, the operation enables convenient removal of the hollow articles in overlapping relationship whereby the articles may be expeditiously removed or ejected without jamming by first removing an article from one side of the stack and then from another side of the stack.

Further advantages of the present invention will appear from the ensuing discussion.

BRIEF DESCRIPTION OF THE DRAWINGS

The present invention will be more readily understandable from a consideration of the drawings which form a part of the present specification wherein.

DETAILED DESCRIPTION

Figure 1:
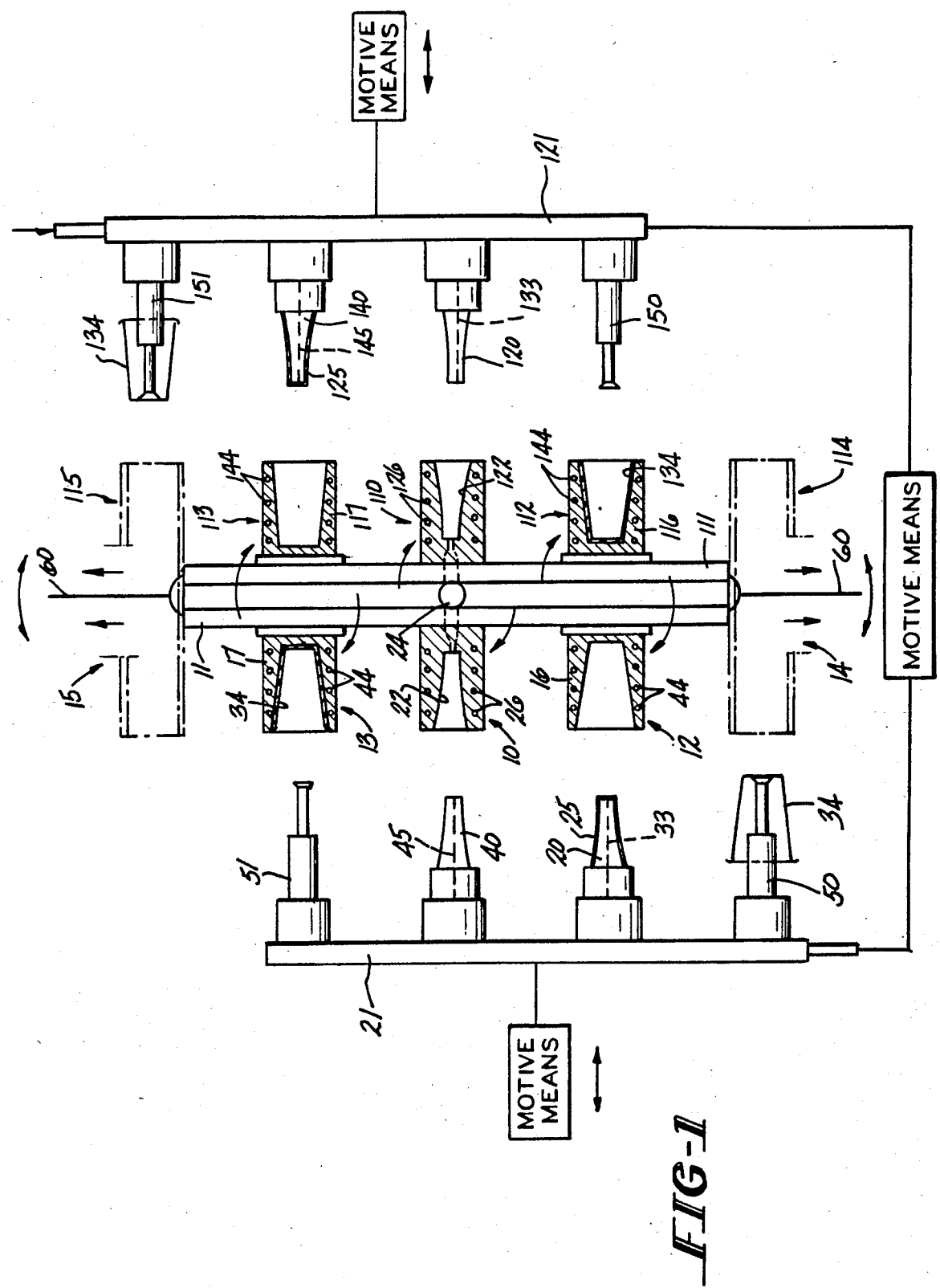
FIG. 1 represents an elevational partly schematic view showing the apparatus of the present invention in the open position.

Referring to the drawing, injection station 10, the first injection station, is secured in platen 11. First and third blow stations 12 and 13 are also secured to platen 11 and are situated adjacent injection station 10 and in side-by-side relationship with respect thereto, with blow station 12 containing first blow mold 16 which may be split if desired being on one side of the injection station and blow station 13 containing third blow mold 17 which may be split if desired being on the other side. Blow molds 16 and 17 correspond to the shape of the hollow articles to be made. First and third ejection stations 14 and 15 are also secured to platen 11 and are situated adjacent the respective blow stations in side-by-side relationship with respect thereto, with first ejection station 14 situated adjacent first blow station 12 and third ejection station 15 situated adjacent third blow station 13.

Figure 2:
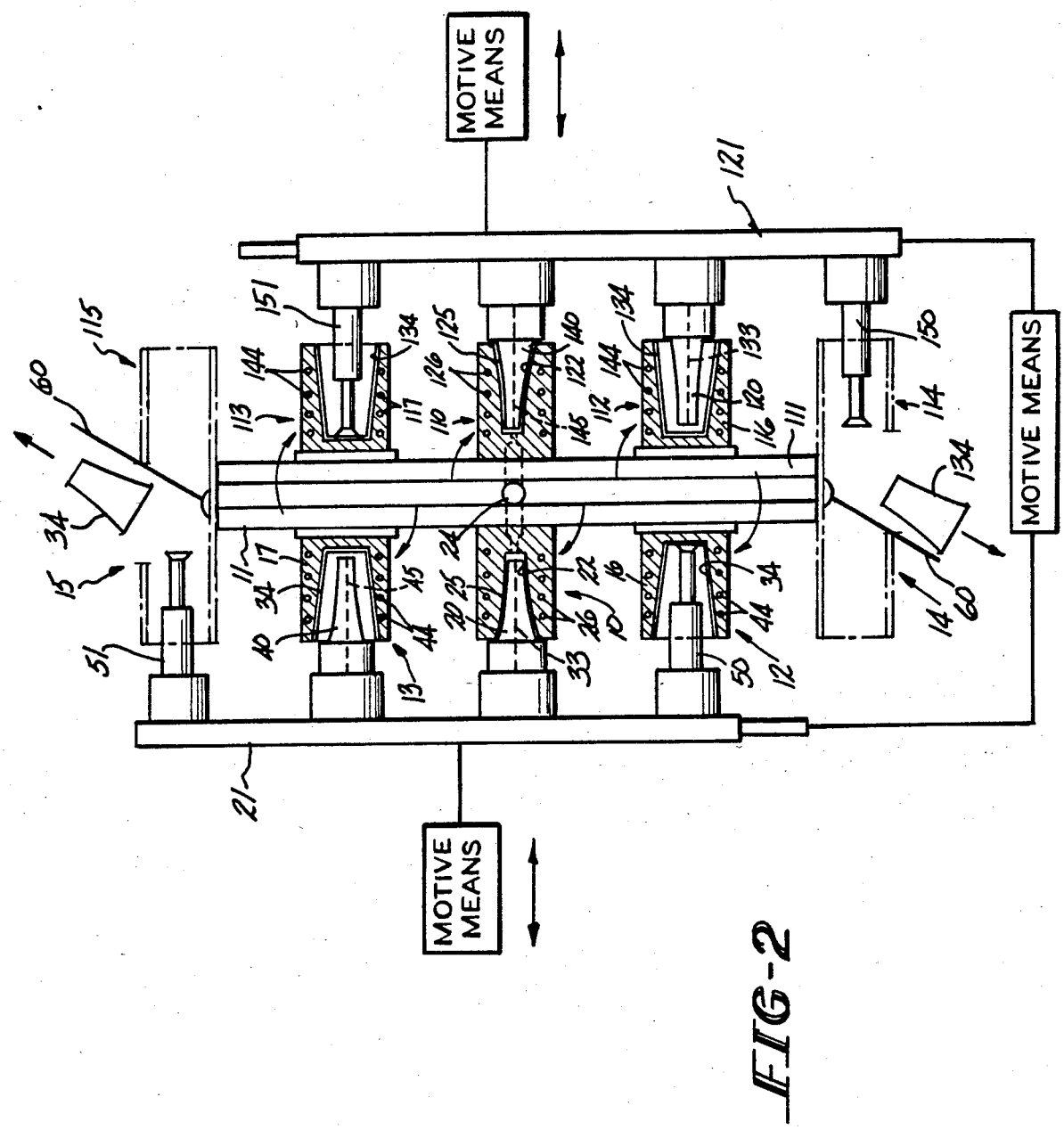
FIG. 2 represents an elevational partly schematic view showing the apparatus of the present invention in the closed position.

First core 20 is provided secured to movable platen 21 engageable with first injection station 10. The injection station 10 includes mold wall 22. Thus, when core 20 is engaged with injection station 10 as shown in FIG. 2 the core 20 is spaced from the mold wall 22 to form a first mold cavity therebetween. Injection means 24 is in communication with the mold cavity and is connected to a source of hot flowable plastic (not shown) for forcing said hot formable plastic under pressure into the first mold cavity to form a parison therein, as parison 25.

Core 20 is movable into and out of engagement with injection station 10 by movable platen 21 actuated by the motive means shown schematically in the drawings and in a cycle to be described in more detail hereinbelow. Naturally, the movement of platen 21 may be accomplished by conventional means, shown only schematically in the drawings, which are capable of providing a clamping force between the two platens to keep them from separating during the injection step and the other steps which will be described below.

The hot, newly formed parison 25 remains in the mold cavity until sufficiently cooled to be removed, if desired using cooling means 26 adjacent mold wall 22, as for example, by fluid circulation. If desired, such cooling means may also be provided in core 20. After such cooling of parison 25 the clamping force is released and platen 21 is moved away from platen 11 carrying with it core 20 and parison 25 adhered thereto as shown in the drawing. If a neck mold is used as to form a threaded neck portion the neck mold is openable by conventional means and remains closed during the formation of the parison, removal of the parison from the injection station and blowing, which also aids in retention of the parison on the core. In the present embodiment a neck mold is not employed and both the parison and final article have a cup-shaped configuration as seen in the drawing. Thus, parison 25 as well as the final hollow article has a base portion, a curved lip and outwardly flaring side walls extending from the base to lip. The curved lip may serve as an undercut to aid in retention of the parison on the core. Core 20 is provided with fluid passageway 33 connected to a source of fluid pressure for blowing the final article. If desired, a vacuum may be drawn through passageway 33 to aid in retention of the parison on the core.

Core 20 with parison 25 thereon is then moved to first blow station 12 in a manner which first separates the parison from the mold wall 22 by moving the parison on core 20 axially in a straight path away from said mold wall at least until the parison clears the injection station, preferably followed by movement in a substantially arcuate path into axial alignment with first blow station 12 and first blow mold 16, preferably followed by moving the parison on the core axially in a straight path into blow mold 16. The preferred axial-arcuate-axial movements are fully disclosed in said copending U.S. patent application Ser. No. 618,956, now U.S. Pat. No. 4,540,543. Parison 25 is then expanded on core 20 in blow mold 16 by fluid pressure through passageway 33 to form hollow article 34. FIG. 1 shows core 20 with parison 25 thereon removed from the injection station on its path between injection station 10 and blow station 12 and FIG. 2 shows core 20 engaged with the injection station.

After the formation of hollow article 34, core 20 is removed from blow station 12 leaving hollow article 34 remaining therein and returned to the injection station along paths corresponding to the path taken by core 20 from the injection station 10 to the blow mold 16.

Third core 40 having fluid passageway 45 similar to passageway 33 is provided on movable platen 21 adjacent core 20 in side-by-side relationship with respect thereto. Third core 40 is engageable with injection station 10 when core 20 engages blow mold 16 to form a second parison in an overlapping cycle with respect to core 20. Thus, third core 40 engages injection station 10 to form a parison 25 in a manner similar to the formation of a parison on core 20 in the injection station 10. The formation of a parison on core 40 takes place while core 20 is in the blow mold 16 forming the hollow article. Core 40 carrying a parison 25 is then removed from the injection station and transferred to third blow station 13 and third blow mold 17 in a path corresponding to the transfer path of core 10 to first blow station 12 and first blow mold 17 for formation of an additional hollow article 34 in blow mold 17. The transfer of core 40 to blow mold 17 takes place simultaneously with the return of core 20 to injection station 10.

After removal of core 20 from blow station 12 hollow article 34 remains in blow mold 16. Hollow article 34 corresponds in shape generally to parison 25 with an expanded configuration caused by the blowing step. The blown article 34 cools in contact with the walls of the blow mold which may contain cooling means 44, as for example for cooling by fluid circulation in a conventional manner, and may be retained in the blow mold after removal of the core therefrom. First ejection mandrel 50 and third ejection mandrel 51 are provided on movable platen 21 adjacent and in side-by-side relationship to cores 40 and 20, with first ejection mandrel 50 alongside core 20 and third ejection mandrel 51 alongside second core 40. Thus, when cores 20 and 40 leave their respective blow molds 16 and 17 for return to the injection station with the hollow articles remaining therein, ejection mandrels 50 and 51 move into engagement with said hollow articles in the blow molds along paths corresponding to the paths of cores 20 and 40. Mandrels 50 and 51 then disengage from the blow molds removing hollow articles 34 with them and move from the blow stations to the ejection stations along paths corresponding to the paths of cores 20 and 40. Removal of hollow article 34 onto the ejection mandrels may be assisted by a pusher means operatively associated with the blow molds for positively pushing article 34 away from the blow molds. Also, ejection mandrels 50 and 51 may be provided with fluid passageways connected to a source of fluid pressure (not shown) which may be used to draw a vacuum and aid in removal of hollow article 34 from the respective blow molds. The final hollow article is then transferred to the respective ejection station, which may incorporate any suitable ejection means as a chute, suction tube or other conventional means to convey plastic articles. Removal of article 34 from the ejection mandrels 50 and 51 at ejection stations 14 and 15 may be assisted by fluid pressure from the ejection mandrels and also by a stripper means associated with the ejection mandrels. After removal of the hollow article 34 at the ejection stations the cycle is repeated.

The first cores and mandrels together with the first blow station and the first ejection station comprises the first set and the third cores and mandrels together with the third blow station and the third ejection station comprises the third set. Corresponding to the first and third sets there are a second and fourth set with blow stations and ejection stations in back-to-back relationship therewith which function in the same way as the first and third sets in overlapping relationship therewith.

Thus, a second ejection station 110 is provided in back-to-back relationship with the first injection station 10. In side-by-side relationship with the second injection station is the second blow station 112 and in side-by-side relationship with the second blow station is the second ejection station 114, both of these elements being in back-to-back relationship with their counterparts in the first set. Fourth blow station 113 and the fourth ejection station 115 are provided situated back-to-back with their corresponding elements in the third set. Second injection station 110 functions serially with the second and fourth sets similar to first injection station 10. The second and fourth sets are carried by fixed platen 111 which may be joined to platen 11 if convenient. The second injection station may include heating or cooling elements 126 and includes mold wall 122. Similarly, the second and fourth blow stations includes a second blow mold 116 and a fourth blow mold 117 similar to their corresponding elements in the first and third sets together with heating or cooling means 144.

In a manner similar to the first and third sets, second core 120 cooperates with the second injection mold and second blow mold and fourth core 140 cooperates with the second injection station and fourth blow mold. The second and fourth cores are carried by movable platen 121 actuated by motive means shown schematically in a manner similar to platen 21. Molten plastic is fed to second injection station by the same injection means 24 which feeds the first injection station. The second core includes core passageway 133 and the third core includes core passageway 145. Parisons 125 are formed on the second and fourth cores in a manner similar to that described hereinabove. Second ejection mandrel 150 cooperates with the second blow mold and second ejection station and fourth ejection mandrel 151 cooperates with the fourth blow mold and fourth ejection station. Hollow articles 134 are serially ejected via the second and fourth ejection stations.

Alternatively, either platen 21 or platen 121 may be movable only in a lateral direction relative to platens 11 and 111 and fixed only in the axial direction of the cores; while platens 11 and 111 are movable in the axial direction of said cores and while fixed in the perpendicular direction thereto. In such an instance hot molten plastic is injected in a direction perpendicular to platens 11 and 111 by means arranged between the cores and injection molds, as is customary in injection molding using stack molds.

Thus, in accordance with the process and apparatus of the present invention the operation is as follows. First core 20 cooperates with the first injection mold to form a parison thereon. The parison is removed from the first injection mold on core 20 and transferred on core 20 to first blow mold 16 where a hollow article is formed therein. At the same time third core 40 is situated in injection station 10 to form an additional parison thereon. The hollow article formed on core 20 is left in the first blow mold, core 20 removed therefrom and first ejection mandrel 50 engaged therewith and transferred thereon to first ejection station 14 for removal therefrom. First core 20 is then resituated in first injection mold for repeat of the cycle. Third core 40 and third ejection mandrel 51 repeats the cycle in overlapping relationship with the first core and first ejection mandrel. Thus, for the first and third sets while first ejection mandrel 50 is situated in first ejection station 14 and first core 20 in first blow mold 16, third ejection mandrel 51 is situated in third blow mold 17 and third core 40 in the injection mold.

Simultaneously with the operation of the first and third cores the second and fourth cores perform the identical functions except that fourth mandrel 151 is situated in fourth ejection station 115 while third mandrel 51 is situated in third blow mold 17. Similarly, first ejection mandrel 50 is situated in first ejection station 14 while second ejection mandrel 150 is situated in second blow mold 116.

This procedure enables one to conveniently and expeditiously utilize the back-to-back ejection stations serially in an overlapping cycle. Gate means 60 are provided in each ejection station to enable the articles to be ejected from the respective ejection stations. Thus, the overlapping cycles provide a cooperative relationship between all cores and molds and ejection stations and enable the performance of a plurality of functions in overlapping relationship without interference from one to the other.

An additional advantage of the process and device of the present invention resides in the use of a coordinated motive means to move platens 21 and 121 with resultant conservation of energy. For example one may conveniently use mechanical means such as pulleys where the platens are in balance and only a slight force is necessary to move said platens. Alternatively, a common fluid pressure source may be associated with each platen all in a known manner.

While the present invention has been discussed with a preferred embodiment, it can be readily understood that numerous variations may be conveniently employed based on requirements. For example, if desired one may utilize conventional hot runners associated with both injection molds communicating with a distributor member by means of telescoping channels and gating means. Thus, for example, one may provide that the melt runner system extend through a movable center platen to reach the cavities. Alternatively, if desired one may conveniently use only two sets, for example only the first and second set may be employed in an overlapping relationship. Still further, if desired one may leave either platen 21 or 121 stationary and move the other platens in cooperative relationship therewith. Naturally, other variations may be readily apparent to one skilled in the art.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Process for injection blow molding hollow plastic articles which comprises providing back-to-back first and second injection molds each including a respective first and second mold cavity formed by a respective first and second mold wall, each of said cavities cooperating with a respective first and second core, back-to-back first and second blow molds each adjacent respective first and second mold cavities in side-by-side relationship therewith, back-to-back first and second ejection stations in side-by-side relationship with said respective first and second blow molds, and first and second ejection mandrels adjacent respective first and second cores, and engageable with said first and second ejection stations, respectively, wherein said cores, mandrels, blow molds and ejection stations comprise a first set and a second set, respectively, and including the step of providing a third and fourth set of cores, mandrels, blow molds and ejection stations adjacent and in line with the first and second set, respectively, with said blow molds and ejection stations being in back-to-back relationship with each other and on opposite sides of said first and second injection molds, injecting molten plastic into said mold cavities to form first and second parisons on said cores, moving said parisons on said cores into said blow molds, expanding said parisons on said cores in said blow molds to form hollow articles, transferring said hollow articles to said ejection stations from said blow molds on said ejection mandrels and removing said hollow articles from said ejection stations, wherein said first and second cores and said first and second mandrels operate in overlapping cycles whereby said first core and first mandrel are located at said first injection mold and first blow mold, respectively, while said second core and second mandrel are located at a position spaced from said second injection mold and second blow mold, respectively and whereby said first core and first mandrel are located at said first blow mold and first ejection station, respectively, while said second core and second mandrel are located at a position spaced from said second blow mold and second ejection station, respectively, and said third and fourth sets are simultaneously in corresponding positions, including the step of providing a common platen for said first and third cores and a common platen for said second and fourth cores, with a balanced motive means for both platens and moving said common platens via said balanced motive means.

2. A process according to claim 1 wherein said second core is located at said second blow mold while said first core is located at said first injection mold.

3. A process according to claim 1 wherein the first injection mold cooperates with the first and third set and the second injection mold cooperates with the second and fourth set.

4. An apparatus for injection blow molding hollow plastic articles which comprises back-to-back first and second injection molds each including a mold wall, opposing first and second cores each engageable with a respective injection mold to form a mold cavity with its respective mold wall, means to inject molten plastic into said mold cavities to form parisons therein, back-to-back first and second blow molds adjacent respective injection mold cavities in side-by-side relationship therewith, back-to-back first and second ejection stations adjacent respective blow molds in side-by-side relationship therewith, first and second ejection mandrels in side-by-side relationship with said first and second cores engageable with said first and second ejection stations, respectively, wherein said cores, mandrels, blow molds and ejection stations comprise a first and second set, respectively, and a third and fourth set of cores, mandrels, blow molds and ejection stations adjacent and in line with the first and second set, respectively, with said blow molds and ejection stations being in back-to-back relationship with each other and on opposite sides of said first and second injection molds, means to move said parisons from said first and second injection molds to said first and second blow molds and means to expand said parisons in said blow molds to form hollow articles therein, means to move said hollow articles on said ejection cores from said blow molds to said ejection stations for removal therefrom, and means to locate said first and second cores in overlapping cycles wherein said first core and first mandrel are located at said first injection mold and first blow mold, respectively, while said second core and second mandrel are located at a position spaced from said second injection mold and second blow mold, respectively, and wherein said first core and first mandrel are located at said first blow mold and first ejection station, respectively, while said second core and second mandrel are located at a position spaced from said second blow mold and second ejection station, respectively, and wherein said third and fourth sets are simultaneously in corresponding positions, including a common platen for said first and third cores and a common platen for said second and fourth cores, with a balanced motive means for both platens.

5. An apparatus according to claim 4 wherein said second core is located at said second blow mold while said first core is located at said first injection mold.

6. An apparatus according to claim 4 wherein the first injection mold cooperates with the first and third sets and the second injection mold cooperates with the second and fourth sets.

* * * * *